(12) United States Patent
Kim et al.

(10) Patent No.: US 11,196,038 B2
(45) Date of Patent: Dec. 7, 2021

(54) FLEXIBLE ELECTRODE, METHOD FOR MANUFACTURING THE SAME AND SECONDARY BATTERY INCLUDING THE SAME

(71) Applicant: LG Chem, Ltd., Seoul (KR)

(72) Inventors: Ju-Ryoun Kim, Daejeon (KR); Min-Kyu You, Daejeon (KR); In-Sung Uhm, Daejeon (KR)

(73) Assignee: LG Chem, Ltd.

( * ) Notice: Subject to any disclaimer, the term of this patent is extended or adjusted under 35 U.S.C. 154(b) by 54 days.

(21) Appl. No.: 16/344,473

(22) PCT Filed: May 18, 2018

(86) PCT No.: PCT/KR2018/005745
§ 371 (c)(1),
(2) Date: Apr. 24, 2019

(87) PCT Pub. No.: WO2018/216970
PCT Pub. Date: Nov. 29, 2018

(65) Prior Publication Data
US 2020/0058928 A1    Feb. 20, 2020

(30) Foreign Application Priority Data

May 22, 2017   (KR) .................. 10-2017-0063010

(51) Int. Cl.
*H01M 4/80* (2006.01)
*H01M 4/139* (2010.01)
(Continued)

(52) U.S. Cl.
CPC ......... *H01M 4/139* (2013.01); *H01M 4/0404* (2013.01); *H01M 4/74* (2013.01); *H01M 4/808* (2013.01); *H01M 10/052* (2013.01)

(58) Field of Classification Search
CPC ...... H01M 4/139; H01M 4/0404; H01M 4/74; H01M 4/742; H01M 4/745; H01M 4/747;
(Continued)

(56) References Cited

U.S. PATENT DOCUMENTS

2013/0040205 A1   2/2013   Hosoe et al.
2013/0224584 A1   8/2013   Sung et al.
(Continued)

FOREIGN PATENT DOCUMENTS

CN   101867037 A   10/2010
CN   102683655 A   9/2012
(Continued)

OTHER PUBLICATIONS

Search report from International Application No. PCT/KR2018/005745, dated Aug. 23, 2018.
(Continued)

*Primary Examiner* — Raymond Alejandro
(74) *Attorney, Agent, or Firm* — Lerner, David, Littenberg, Krumholz & Mentlik, LLP (57) ABSTRACT

Provided is a method for manufacturing a flexible electrode, including the steps of: (i) coating a porous current collector having a plurality of pores with an active material slurry having a solid content of 30-50% and drying the active material slurry to form an active material coating layer; (ii) coating an active material slurry having a solid content of 30-50% on the active material coating layer formed from the preceding step and drying the active material slurry to form an additional active material coating layer; and (iii) repeating step (ii) n times ($1 \leq n \leq 5$) to form multiple active material coating layers, thereby forming an electrode active material layer in the pores and on the surface of the porous current collector in a non-press mode. A flexible electrode obtained
(Continued)

from the method and a lithium secondary battery including the flexible electrode are also provided.

5 Claims, 5 Drawing Sheets

(51) Int. Cl.
  *H01M 4/04* (2006.01)
  *H01M 4/74* (2006.01)
  *H01M 10/052* (2010.01)
(58) Field of Classification Search
  CPC .......... H01M 4/80; H01M 4/808; H01M 4/70; H01M 10/052
  See application file for complete search history.

(56) References Cited

U.S. PATENT DOCUMENTS

| | | | |
|---|---|---|---|
| 2014/0370351 A1 | 12/2014 | Kwon et al. | |
| 2014/0377620 A1 | 12/2014 | Kwon et al. | |
| 2015/0125745 A1 | 5/2015 | Kaneda | |
| 2016/0056470 A1* | 2/2016 | Yamaguchi | H01M 4/13 429/217 |
| 2016/0133942 A1 | 5/2016 | Kwon et al. | |
| 2017/0077546 A1 | 3/2017 | Zhamu et al. | |
| 2017/0207489 A1* | 7/2017 | Zhamu | H01M 4/808 |

FOREIGN PATENT DOCUMENTS

| | | |
|---|---|---|
| CN | 103201882 A | 7/2013 |
| CN | 104393231 A | 3/2015 |
| CN | 104466093 A | 3/2015 |
| CN | 105051961 A | 11/2015 |
| JP | H11111272 A | 4/1999 |
| JP | H11144715 A | 5/1999 |
| JP | H11307103 A | 11/1999 |
| JP | 2003308831 A | 10/2003 |
| JP | 2003331829 A | 11/2003 |
| JP | 2011049023 A | 3/2011 |
| JP | 2012186143 A | 9/2012 |
| JP | 2013214374 A | 10/2013 |
| JP | 2013243063 A | 12/2013 |
| JP | 2014032798 A | 2/2014 |
| JP | 5761740 B2 | 8/2015 |
| JP | 5832729 B2 | 12/2015 |
| KR | 20050092676 A | 9/2005 |
| KR | 20120124077 A | 11/2012 |
| KR | 101366011 B1 | 2/2014 |
| KR | 20140031953 A | 3/2014 |
| KR | 20150061602 A | 6/2015 |
| KR | 20160027365 A | 3/2016 |
| KR | 101628901 B1 | 6/2016 |
| KR | 20160118586 A | 10/2016 |
| KR | 20160139617 A | 12/2016 |
| KR | 20160144756 A | 12/2016 |
| WO | 2013180168 A1 | 12/2013 |
| WO | 2015020338 A1 | 2/2015 |

OTHER PUBLICATIONS

Extended European Search report from EU 18806303.6 dated Sep. 11, 2019, 2 pages.
List of Documents cited from Office Action for Indian Application No. 201917016063 dated Mar. 16, 2021; 1 page.
Search Report from Chinese Application No. 201880004323.4 dated Aug. 2, 2021. 3 pgs.

* cited by examiner

FLEXIBLE ELECTRODE, METHOD FOR MANUFACTURING THE SAME AND SECONDARY BATTERY INCLUDING THE SAME

CROSS-REFERENCE TO RELATED APPLICATIONS

The present application is a national phase entry under 35 U.S.C. § 371 of International Application No. PCT/KR2018/005745 filed May 18, 2018, which claims priority from Korean Application No. 10-2017-0063010 filed May 22, 2017, all of which are incorporated herein by reference.

TECHNICAL FIELD

The present disclosure relates to a flexible electrode, a method for manufacturing the same, and a secondary battery including the same. Particularly, the present disclosure relates to a flexible electrode having excellent flexibility while realizing a high loading, a method for manufacturing the same, and a secondary battery including the same.

BACKGROUND ART

As technological development and a demand for mobile instruments have been increased, rechargeable secondary batteries which can be downsized and provide high capacity have been increasingly in demand. In addition, among such secondary batteries, lithium secondary batteries having high energy density and voltage have been commercialized and used widely.

A lithium secondary battery has a structure including an electrode assembly which has electrodes, i.e., a positive electrode and a negative electrode, including an active material coated on a current collector and a separator interposed between the electrodes, and a lithium salt-containing electrolyte injected to the electrode assembly. Each of the electrodes is generally obtained by coating a foil-like current collector with a slurry containing an active material, binder and a conductive material, drying the slurry, and forming an active material layer through a pressing step.

Recently, a high-loading electrode is increasingly in demand and such a high-loading electrode is obtained by increasing the density of the active material in the electrode layer (i.e., by decreasing the porosity or pores) in order to provide a battery with high capacity. To obtain a high-loading electrode, the electrode layer becomes thick generally. However, such a thick electrode layer is problematic in that it is difficult to distribute an active material, binder and a conductive material homogeneously in the electrode layer and the electrode shows high brittleness even under slight bending.

Therefore, many attempts have been made to use a porous current collector having a three-dimensional network shape in order to obtain an electrode amenable to bending while providing a high loading.

For example, Korean Patent Laid-Open No. 10-2005-0092676 discloses an electrode obtained by filling the pores of a porous three-dimensional current collector, such as foamed metal, metal fibers, porous metal, etched metal or metal having surface irregularities on the front surface and the back surface, with a slurry prepared from an electrode active material, conductive material, binder and an organic solvent, drying the slurry, and then carrying out pressing with a press, or the like.

When an active material layer is formed by the conventional method including coating, drying and pressing of an active material slurry while using a porous current collector as mentioned above, the porous current collector may be elongated and the internal materials, such as the active material, may be cracked undesirably during the pressing. Thus, it is difficult to carry out pressing under high pressure. It is also difficult to fill the porous current collector having a large thickness homogeneously with the active material.

DISCLOSURE

Technical Problem

The present disclosure is designed to solve the problems of the related art, and therefore the present disclosure is directed to providing a flexible electrode having excellent flexibility while realizing a high loading.

The present disclosure is also directed to providing a method for manufacturing the electrode.

In addition, the present disclosure is directed to providing a lithium secondary battery including the electrode.

Technical Solution

In one aspect of the present disclosure, there is provided a method for manufacturing a flexible electrode, including the steps of: (i) coating a porous current collector having a plurality of pores with an active material slurry having a solid content of 30-50% and drying the active material slurry to form an active material coating layer; (ii) coating an active material slurry having a solid content of 30-50% on the active material coating layer formed from the preceding step and drying the active material slurry to form an additional active material coating layer; and (iii) repeating step (ii) n times ($1 \leq n \leq 5$) to form multiple active material coating layers, thereby forming an electrode active material layer in the pores and on the surface of the porous current collector in a non-press mode.

In the method, step (ii) and step (iii) may be carried out under a reduced pressure of −1 to −0.01 MPa, preferably −0.1 MPa.

In addition, the porous current collector may have a porosity of 60% or more and a thickness of 100-400 μm.

The porous current collector may be selected from foamed type, web type, felt type and mesh type current collectors, and may include any one material selected from: stainless steel, aluminum, nickel, titanium, baked carbon and copper; stainless steel surface-treated with carbon, nickel, titanium or silver; aluminum-cadmium alloy; non-conductive polymers surface-treated with conductive materials; non-conductive polymers surface-treated with metals, such as aluminum; and conductive polymers.

The first active material coating layer may be formed to have a thickness corresponding to the thickness of the porous current collector, and the second active material coating layer may be formed to have a thickness of 50% or less of the thickness of the porous current collector.

In another aspect of the present disclosure, there is also provided a flexible electrode including a porous current collector having a plurality of pores, and an electrode active material layer formed in the pores and on the surface of the porous current collector, wherein the porous current collector and the flexible electrode have a thickness ratio of 1:1.05-1:1.2.

In addition, the porous current collector and the flexible electrode may have a thickness ratio of 1:1.05-1:1.1, 1:1.05-1:1.08, or 1:1.08-1:1.2.

In the flexible electrode, the pores present in the porous current collector may have an average diameter of 5-100 µm, the electrode active material layer fills up the pores of the porous current collector, the active material may be loaded in an amount of 3.0-20.0 mAh/cm$^2$, and the whole electrode including the porous current collector and the electrode active material layer may have a porosity of 10-50%.

The whole electrode including the porous current collector and the electrode active material layer may have a porosity of 20-40%, preferably.

The flexible electrode has excellent flexibility as determined by a bending test using a 15R bar having a diameter of 30 mm, wherein the flexible electrode causes cracking or separation of the active material when bending is repeated 1,000 times or more.

In still another aspect, there is provided a lithium secondary battery including the flexible electrode.

Advantageous Effects

According to the present disclosure, it is possible to provide a high-loading flexible electrode by filling the pores of a porous current collector with an active material homogeneously with high density through a series of steps including coating and drying an active material slurry having a low solid content many times on the porous current collector to reduce the porosity of the electrode in a non-press mode.

BEST MODE

Hereinafter, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect, there is provided a method for manufacturing a flexible electrode characterized by forming an electrode active material layer in the pores and on the surface of a porous current collector in a non-press mode, the method including the steps of:

(i) coating a porous current collector having a plurality of pores with an active material slurry having a solid content of 30-50% and drying the active material slurry to form an active material coating layer;

(ii) coating an active material slurry having a solid content of 30-50% on the active material coating layer formed from the preceding step and drying the active material slurry to form an additional active material coating layer; and (iii) repeating step (ii) n times (1≤n≤5) to form multiple active material coating layers.

According to the present disclosure, it is possible to form multiple electrode active material layers without using a pressing step by coating and drying an active material slurry having a low solid content and viscosity repeatedly on a porous current collector.

Figure 2:
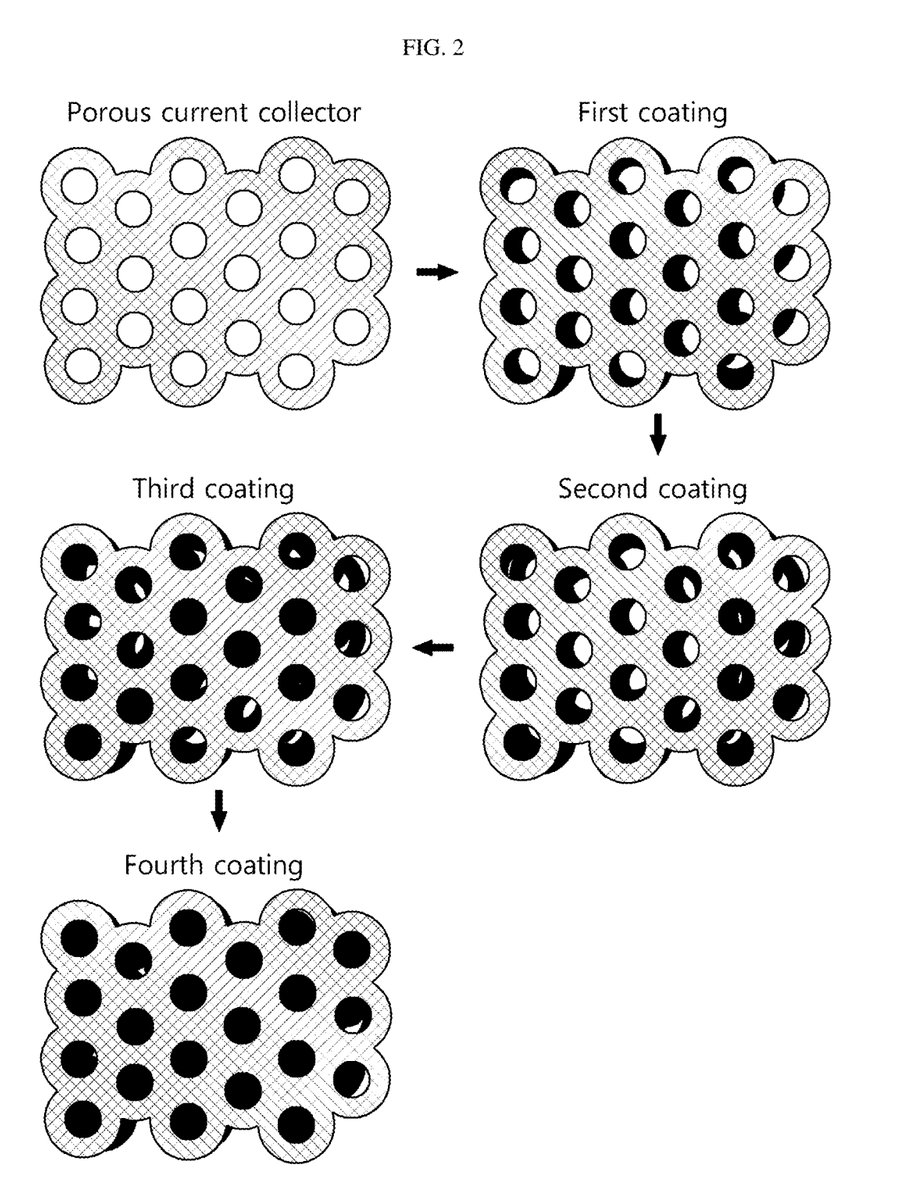
FIG. 2 is a schematic view illustrating the process for manufacturing a flexible electrode according to an embodiment of the present disclosure.

FIG. 2 is a schematic view illustrating the process for manufacturing a flexible electrode according to an embodiment of the present disclosure. For example, FIG. 2 shows a series of steps for forming an electrode active material layer by coating a porous current collector four times with an active material slurry having a low solid content.

As shown in FIG. 2, when an active material slurry having a solid content less than 50%, preferably 30-50%, is coated and dried first on a porous current collector having a thickness of 100-400 µm, the pores present in the current collector may be filled partially with the active material. Herein, when the solid content is larger than 50%, the slurry has high viscosity and shows low flowability. Thus, it is difficult for the slurry to be introduced sufficiently into the pores of the current collector, and thus the slurry remains outside of the pores. In addition, the coating layer may be formed to a thickness corresponding to the thickness of the porous current collector, and may be dried at a temperature of 130° C. or higher for 15 minutes or more. Herein, 'coating layer is formed to a thickness corresponding to the thickness of the porous current collector' means that the slurry fills up the pores of the porous current collector to form a coating layer with a thickness corresponding to the thickness of the porous current collector. Thus, this means that the formed coating layer does not have a thickness larger than the thickness of the porous current collector.

After the first coating, the active material slurry is coated and dried again on the first active material coating layer so that the pores of the electrode including the porous current collector, i.e., non-filled pores of the porous current collector, and the pores of the first active material coating layer may be filled with the active material. Herein, not only the inner part of the pores of the porous current collector but also the surface thereof may be coated. Similarly to the first active material coating layer, the active material slurry used for the second coating has a solid content less than 50%. Meanwhile, it is advantageous that the second active material coating layer is formed to a thickness of 50% or less, preferably 30-45%, of the thickness of the porous current collector with a view to preventing an excessive increase in thickness of the finished electrode. In addition, the coating layer may be dried at a temperature of 130° C. or higher for 15 minutes or more.

The third coating and the fourth coating may be repeated in the same manner as described above. Herein, it is advantageous that the thickness of the coating layer has a thickness smaller than the thickness of the coating layer formed from the preceding step with a view to controlling the thickness of the finished electrode. In other words, as coating steps are repeated, the electrode including the current collector and the electrode active material layer has decreased porosity, and thus the amount of slurry coated additionally is decreased.

When coating is repeated as described above, the pores of the electrode including the porous current collector is filled homogeneously and sufficiently with the active material, and thus the whole electrode has decreased porosity.

According to the above-described method, it is possible to overcome the disadvantage of the methods for manufacturing a flexible electrode according to the related art. According to the related art, when a slurry having a high solid content was coated and dried on a porous current collector having three-dimensional micropores in order to realize a high-loading electrode, the pores of the current collector could not be filled sufficiently with the active material layer, and thus a pressing step was required to increase the density of the active material. During the pressing step, pressing could not be carried out sufficiently to prevent elongation of the current collector, and thus the density of the active material could not be increased to a desired level.

In other words, according to the method for manufacturing a flexible electrode according to an embodiment of the present disclosure, it is possible to fill the inner part of the pores of the porous current collector having three-dimensional micropores with the active material at high density even in the absence of a pressing step. Even when the thickness of the porous current collector is increased to realize a high-loading electrode, it is possible to insert a sufficient amount of the active material homogeneously into the pores of the porous current collector. In addition, as coating steps are repeated, the surface of the porous current collector is also coated with the active material. Herein, it is possible to ensure the flexibility of the finished electrode by controlling the coating thickness.

In the method according to an embodiment of the present disclosure, a reduced pressure process may be used as driving force for migration of the active material slurry during step (ii) and step (iii). For example, when the additional coating is carried out under a reduced pressure condition of −1 to −0.01 MPa, preferably −0.1 MPa, it is possible to induce migration of the active material to the pores of the porous current collector that are not coated during the preceding coating step, and thus to increase the filling ratio of the active material.

Figure 1:
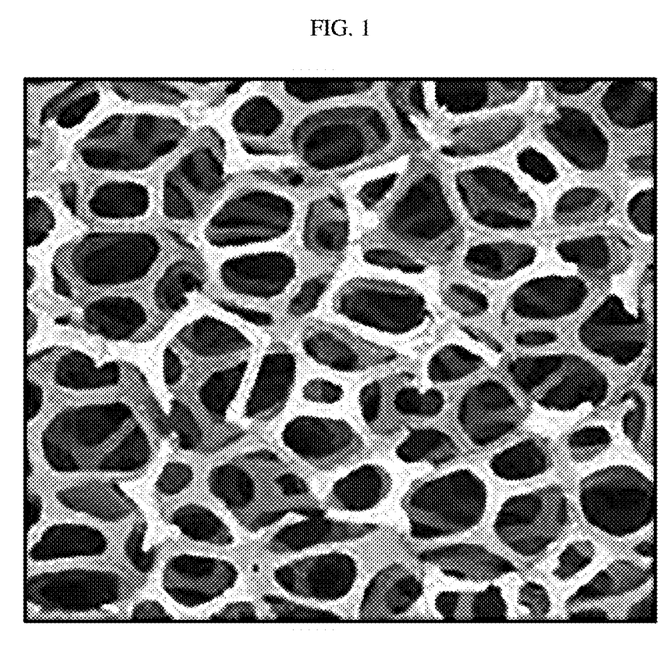
FIG. 1 is a microscopic view illustrating the three-dimensional micropores of the porous current collector used according to an embodiment of the present disclosure.

In the method according to an embodiment of the present disclosure, the porous current collector may have three-dimensional micropores having an average diameter of 5-100 μm, preferably 5-50 μm. For example, the porous current collector may be a foamed, web type, felt type or a mesh type current collector. FIG. 1 is a microscopic image illustrating the three-dimensional micropores of the porous current collector used according to the present disclosure.

The diameter of the three-dimensional micropores of the porous current collector may be determined by a method used conventionally in the art. For example, it may be determined by observing a scanning electron microscopic (SEM) image. When the porous current collector satisfies the above-defined average diameter range, it is possible to obtain an electrode amenable to bending while realizing a high loading. For example, the average diameter range of the micropores is set considering the size of an active material. When the average diameter is less than 5 μm, the active material cannot be introduced to the pores but only smaller conductive materials or binders can be introduced thereto. When the average diameter is larger than 100 μm, it is difficult to support the electrode materials, including the active material, and thus the materials may be separated.

The porous current collector may include a material selected from: stainless steel, aluminum, nickel, titanium, baked carbon and copper; stainless steel surface-treated with carbon, nickel, titanium or silver; aluminum-cadmium alloy; non-conductive polymers surface-treated with conductive materials; non-conductive polymers surface-treated with metals, such as aluminum; and conductive polymers. Particularly, it is preferred to use an aluminum-plated polyethylene terephthalate (PET) felt with a view to flexibility.

The thickness of the porous current collector is not particularly limited as long as it meets the object of realizing a high-loading electrode. For example, the porous current collector may have a thickness of 100-400 μm, preferably 100-140 μm. In addition, the porous current collector may have a porosity of 60% or more, preferably 70-80%, with a view to bending of the electrode, i.e., flexibility of the electrode.

Meanwhile, the active material slurry used for each coating step of the method according to the present disclosure may be obtained by dispersing an active material in a solvent, optionally adding a binder or conductive material thereto and carrying out agitation. As mentioned above, the slurry preferably has a solid content less than 50%.

There is no particular limitation in the method for preparing the active material slurry, as long as it is a method used conventionally in the art. For example, a coating process using a slot die, Mayer bar coating process, gravure coating process, dip coating process, or a spray coating process may be used.

When the electrode according to the present disclosure is used as a positive electrode, the active material may include any one active material particle selected from the group consisting of $LiCoO_2$, $LiNiO_2$, $LiMn_2O_4$, $LiCoPO4$, $LiFePO_4$, and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, and each of x, y and z independently represents the atomic proportion of an element forming an oxide, wherein $0 \leq x < 0.5$, $0 \leq y < 0.5$, $0 \leq z < 0.5$, $0 < x+y+z \leq 1$), or a combination of two or more of them. When the electrode according to the present disclosure is used as a negative electrode, the active material may include any one active material particle selected from: natural graphite, artificial graphite, carbonaceous materials; lithium-containing titanium composite oxides (LTO); metals, such as Si, Sn, Li, Zn, Mg, Cd, Ce, Ni or Fe; alloys including such metals (Me); oxides (MeOx) of such metals; and complexes of such metals (Me) with carbon, or a combination of two or more of them.

Particular examples of the binder may include various binder polymers, such as polyvinylidene fluoride-hexafluoropropylene copolymer (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylate, styrene-butyrene rubber (SBR), fluororubber, or various copolymers.

The solvent may include N-methyl pyrrolidone, acetone, water or the like.

The conductive material is not particularly limited, as long as it has conductivity while not causing any chemical change in the corresponding battery. Particular examples of the conductive material include: carbon black, such as carbon black, acetylene black, ketjen black, channel black, furnace black, lamp black or thermal black; conductive fibers, such as carbon fibers or metal fibers; metal powder, such as fluorocarbon, aluminum or nickel powder; conductive whiskers, such as zinc oxide or potassium titanate; metal oxides, such as titanium oxide; conductive materials, such as polyphenylene derivatives; or the like.

In another aspect, there is provided a flexible electrode obtained by the above-described above and including a porous current collector having a plurality of pores and an electrode active material layer formed in the pores and on the surface of the porous current collector. Herein, the porous current collector and the flexible electrode may have a thickness ratio of 1:1.05-1:1.2, particularly 1:1.05-1:1.1, 1:1.05-1:1.08, or 1:1.08-1:1.2. Herein, 'thickness of the flexible electrode' means the total thickness of a finished electrode including the porous current collector and the electrode active material layer formed in the pores and on the surface of the porous current collector. According to the present disclosure, methods for determining the thickness of an electrode are not particularly limited. For example, the thickness may be determined by the method as described in the following test example.

In other words, the flexible electrode according to the present disclosure satisfies the above-defined range of thickness ratio of the porous current collector and the finished electrode, and thus may be provided with flexibility while the active material homogeneously fills up the porous current collector having a large thickness with no damage upon the porous current collector. When the thickness ratio of the porous current collector and the finished electrode is less than 1:1.05, the porous current collector may be elongated due to the pressing step carried out for manufacturing the electrode. When the pressing is controlled to a weak level after single coating in order to prevent the elongation of the porous current collector, the active material, conductive material and the current collector may be in a low degree of contact with each other in the pores of the porous current collector, and thus the capacity per unit area of the electrode may be decreased. Meanwhile, when the thickness ratio of the porous current collector and the finished electrode is larger than 1:1.2, the electrode coating layer having an increased thickness may cause degradation of flexibility and may be separated from the surface of the current collector. In addition, the electrode coating layer has a large distance from the current collector to cause an increase in resistance upon high-rate operation, thereby adversely affecting the performance of the battery.

Additionally, in the flexible electrode according to the present disclosure, the pores present in the porous current collector may have an average diameter of 5-100 μm, the electrode active material layer fills up the pores of the porous current collector, the active material may be loaded in an amount of 3.0-20.0 mAh/cm$^2$, and the whole electrode including the porous current collector and the electrode active material layer may have a porosity of 10-50%.

More particularly, the electrode active material layer includes multiple active material coating layers formed by coating and drying an active material slurry having a low solid content on a porous current collector at least two times. Thus, it is possible to fill the pores present in the porous current collector with a sufficient amount of active material, resulting in a decrease in porosity of the electrode.

Therefore, the whole electrode including the porous current collector and the electrode active material may have a porosity of 10-50%, preferably 20-40%, more preferably 20-35%, and even more preferably 20-28%. The methods for determining the porosity of the electrode are not particularly limited. For example, it may be determined by using a BET (Brunauer-Emmett-Teller) method or Hg porosimetry.

When the whole electrode has a porosity less than 10%, it is difficult to realize an electrode having excellent flexibility. When the whole electrode has a porosity larger than 50%, the active material is loaded insufficiently, thereby making it difficult to realize a high-loading electrode. In this case, it is difficult to obtain an electrode having an improved capacity per volume or improved energy density.

The flexible electrode having the above-defined range of porosity according to the present disclosure not only has excellent flexibility but also shows a high active material loading amount of 3.0-20.0 mAh/cm$^2$, preferably 3.0-12.0 mAh/cm$^2$, and thus can realize a high-loading electrode. An active material loading amount less than 3.0 mAh/cm$^2$ is not sufficient. On the other hand, when the loading amount is larger than 20.0 mAh/cm$^2$, it is difficult to realize capacity substantially, and the battery performance may be degraded during rapid charging.

In addition, the flexible electrode according to the present disclosure has excellent flexibility as determined by a bending test using a 15R bar having a diameter of 30 mm, wherein the flexible electrode causes cracking or separation of the active material when bending is repeated 1,000 times or more.

In still another aspect, there is provided a lithium secondary battery including the flexible electrode. Particularly, the lithium secondary battery may be obtained by injecting an electrolyte to an electrode assembly including a positive electrode, a negative electrode and a separator interposed between both electrodes.

The flexible electrode according to the present disclosure may be used as the positive electrode and the negative electrode.

The separator may be a conventional porous polymer film used as a separator according to the related art. For example, a porous polymer film obtained by using a polyolefin-based polymer, ethylene homopolymer, propylene homopolymer, ethylene/butane copolymer, ethylene/hexane copolymer or ethylene/methacrylate copolymer may be used alone, or a stack of such polymers may be used. In addition, an insulating thin film having high ion permeability and mechanical strength may be used. The separator may include a safety reinforced separator (SRS) including a ceramic material coated on the surface of a separator to a small thickness. Particular examples of such a separator include a porous nonwoven web, such as a nonwoven web made of glass fibers having a high melting point or polyethylene terephthalate fibers, but are not limited thereto.

The electrolyte includes a lithium salt as an electrolyte and an organic solvent for dissolving the electrolyte.

Any lithium salt may be used with no particular limitation, as long as it is used conventionally for an electrolyte for a secondary battery. For example, the lithium salt may include any one anion selected from the group consisting of F$^-$, Cl$^-$, I$^-$, NO$_3^-$, N(CN)$_2^-$, BF$_4^-$, ClO$_4^-$, PF$_6^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, (SF$_5$)$_3$C$^-$, (CF$_3$SO$_2$)$_3$C$^-$, CF$_3$(CF$_2$)$_7$SO$_3^-$, CF$_3$CO$_2^-$, CH$_3$CO$_2^-$, SCN$^-$ and (CF$_3$CF$_2$SO$_2$)$_2$N$^-$.

The organic solvent used for the electrolyte is not particularly limited, as long as it is used conventionally for an electrolyte for a secondary battery. Typical examples of the organic solvent may include at least one selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, γ-butyrolactone, propylene sulfite and tetrahydrofurane.

Particularly, among the carbonate-based organic solvents, ethylene carbonate and propylene carbonate which are cyclic carbonates are preferred, since they are organic solvents having high viscosity, and thus have a high dielectric constant and dissociate the lithium salt in the electrolyte well. When such a cyclic carbonate is combined with a linear carbonate, such as dimethyl carbonate and diethyl carbonate, having low viscosity and a low dielectric constant at an adequate ratio, it is possible to obtain an electrolyte having high electroconductivity preferably.

Optionally, the electrolyte used according to the present disclosure may further include an additive, such as an anti-overcharging agent, used conventionally for an electrolyte.

The lithium secondary battery according to the embodiment of the present disclosure may be obtained by positioning a separator between a positive electrode and a negative electrode to form an electrode assembly, introducing the electrode assembly to a pouch type casing, cylindrical battery casing or a prismatic battery casing, and injecting an electrolyte thereto. In a variant, the lithium secondary battery may be obtained by stacking electrode assemblies, dipping the stacked electrode assemblies in the electrolyte, and introducing the resultant structure to a battery casing, followed by sealing.

According to an embodiment of the present disclosure, the lithium secondary battery may be a stacked, wound, stacked and folded or cable type lithium secondary battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size batteries include electric vehicles, hybrid electric vehicles, plug-in hybrid electric vehicles, power storage systems, or the like. Particularly, the lithium secondary battery according to the present disclosure may be used advantageously for hybrid electric vehicles and renewable energy storage batteries requiring a high output.

MODE FOR DISCLOSURE

Hereinafter, the present disclosure will be described in detail with respect to the specific embodiments. However, the following examples are not intended to limit the scope of the present disclosure and various changes and modifications may be made. It will be apparent that these exemplary embodiments are provided so that the present disclosure will be complete and understood easily by those skilled in the art.

Example 1

First, $LiCoO_2$ as an active material, carbon black as a conductive material and polyvinylidene fluoride (PVdF) as a binder were added to NMP as a solvent at a weight ratio of 94:4:2 to obtain an active material slurry having a solid content of 40%.

Meanwhile, an Al-plated PET felt type current collector having a thickness of 120 μm and a porosity of 70% by virtue of a plurality of pores having an average diameter of 30 μm was prepared. Then, only the pores of the current collector was filled with the active material slurry to perform first coating to a thickness corresponding to that of the current collector, and the slurry was dried at 130° C. for 15 minutes to form a first active material coating layer.

The same active material slurry prepared as described above was further coated on the first active material coating layer to a thickness corresponding to 50% of the thickness of the current collector, and the slurry was dried at 130° C. for 15 minutes to form a second active material coating layer.

Then, the same active material slurry prepared as described above was further coated on the second active material coating layer to a thickness corresponding to 40% of the thickness of the current collector, and the slurry was dried at 130° C. for 15 minutes to form a third active material coating layer.

Finally, the same active material slurry prepared as described above was further coated on the third active material coating layer to a thickness corresponding to 30% of the thickness of the current collector, and the slurry was dried at 130° C. for 15 minutes to form a fourth active material coating layer. In this manner, a flexible electrode having four electrode active material layers on the porous current collector was obtained. The obtained electrode had a thickness of 130 μm as determined by the method described in the following test examples and the active material loading amount was 4.5 $mAh/cm^2$.

Example 2

The same process as described in Example 1 was carried out to obtain a flexible electrode having four electrode active material layers, except that a vacuum oven (OV-12, JEIO TECH Co.) was used in the steps of forming the second active material coating layer, the third active material coating layer and the fourth active material coating layer so that a reduced pressure condition of −0.1 MPa was maintained for 10 minutes. The obtained electrode had a thickness of 130 μm as determined by the method described in the following test examples and the active material loading amount was 5 $mAh/cm^2$.

Comparative Example 1

First, $LiCoO_2$ as an active material, carbon black as a conductive material and polyvinylidene fluoride (PVdF) as a binder were added to NMP as a solvent at a weight ratio of 92:4:2 to obtain an active material slurry having a solid content of 65%.

Meanwhile, an Al-plated PET felt type current collector having a thickness of 120 μm and a porosity of 70% by virtue of a plurality of pores having an average diameter of 30 μm was prepared. Then, only the pores of the current collector was filled with the active material slurry to perform first coating to a thickness corresponding to that of the current collector, and the slurry was dried at 130° C. for 15 minutes. After that, pressing was carried out by using a roll press to obtain an electrode. Herein, the pressing step was carried out by controlling the gap between rolls to 120 μm, which was smaller than the gap value used for the conventional pressing process, in order to prevent the porous current collector from elongation. The obtained flexible electrode had a thickness of 120 μm as determined by the method as described in the following test examples. Meanwhile, the electrode had an active material loading amount of 2.0 $mAh/cm^2$.

Comparative Example 2

First, $LiCoO_2$ as an active material, carbon black as a conductive material and polyvinylidene fluoride (PVdF) as a binder were added to NMP as a solvent at a weight ratio of 92:4:2 to obtain an active material slurry having a solid content of 65%.

Meanwhile, an Al-plated PET felt type current collector having a thickness of 120 μm and a porosity of 70% by virtue of a plurality of pores having an average diameter of 30 μm was prepared. Then, only the pores of the current collector was filled with the active material slurry to perform first coating to a thickness corresponding to that of the current collector, and the slurry was dried at 130° C. for 15 minutes. After that, pressing was carried out by using a roll press until the electrode had a porosity of 30%. However, the porous current collector was elongated and deformed during the pressing step. In addition, the active material was distributed non-homogeneously in the electrode. Thus, it was difficult to accurately determine the active material loading amount per unit area.

Comparative Example 3

First, $LiCoO_2$ as an active material, carbon black as a conductive material and polyvinylidene fluoride (PVdF) as a binder were added to NMP as a solvent at a weight ratio of 92:4:2 to obtain an active material slurry having a solid content of 65%.

The active material slurry was coated onto a current collector used conventionally for manufacturing a positive electrode, i.e., Al foil having a thickness of 20 μm, to a thickness with which a target loading amount can be accomplished. Then, the slurry was dried at 130° C. for 15 minutes. After that, pressing was carried out by using a roll press until the electrode had a porosity of 30%. The obtained electrode had an overall loading amount of 5.0 $mAh/cm^2$.

Comparative Example 4

First, $LiCoO_2$ as an active material, carbon black as a conductive material and polyvinylidene fluoride (PVdF) as a binder were added to NMP as a solvent at a weight ratio of 94:4:2 to obtain an active material slurry having a solid content of 65%.

Meanwhile, an Al-plated PET felt type current collector having a thickness of 70 μm and a porosity of 70% by virtue of a plurality of pores having an average diameter of 30 μm was prepared. Then, the active material slurry was coated on the current collector to a thickness corresponding to that of the current collector, and the slurry was dried at 130° C. for 15 minutes to form a first active material coating layer.

The same active material slurry prepared as described above was further coated on the first active material coating layer to a thickness corresponding to 60% of the thickness of the current collector, and the slurry was dried at 130° C. for 15 minutes to form a second active material coating layer.

Then, the same active material slurry prepared as described above was further coated on the second active material coating layer to a thickness corresponding to 50% of the thickness of the current collector, and the slurry was dried at 130° C. for 15 minutes to form a third active material coating layer. In this manner, a flexible electrode was obtained.

The obtained electrode had a thickness of 105 μm as determined by the method described in the following test examples and the active material loading amount was 5 $mAh/cm^2$.

Test Example 1: Determination of Porosity and Thickness

The porosity of each of the electrodes according to Examples 1 and 2 and Comparative Examples 1-4 (porosity of the whole electrode including the porous current collector and the electrode active material layer) was calculated from the following formula. The results are shown in the following Table 1.

Porosity=volume of pores present in an electrode per unit weight/(specific volume+pore volume per unit weight), wherein the specific volume is the volume occupied by an object having a unit weight and the inverse number of density.

In the formula, the pore volume was the value calculated by the BJH method, a mesopore determination method, with BELSORP (BET apparatus) available from BEL JAPAN Co.

In addition, in each electrode, the total thickness of the electrode including the current collector and the electrode active material layer formed inside of and on the surface of the current collector was determined by using a two-dimensional thickness measuring system (TESA-μ-HITE, TESA/SWISS).

Test Example 2: Flexibility Test

Each of the electrodes according to Examples 1 and 2 and Comparative Examples 1-4 was determined whether cracking or separation of the active material occurred or not when it was wound and bent on a 15R (diameter 30 mm) bar for use in a bending test. Herein, bending was repeated 1,000 times and the results were evaluated by the following criteria. The results are shown in the following Table 1.

<Evaluation Criteria>

Good: cracking or separation of active material occurs when bending is repeated 1,000 times or more Moderate: cracking or separation of active material occurs when bending is repeated 500 times to less than 1,000 times Poor: cracking or separation of active material occurs when bending is repeated less than 500 times

TABLE 1

|  | Example 1 | Example 2* | Comp. Ex. 1 | Comp. Ex. 2 | Comp. Ex. 3 | Comp. Ex. 4 |
| --- | --- | --- | --- | --- | --- | --- |
| Use of porous current collector | ○ | ○ | ○ | ○ | X | ○ |
| Solid content | 40% | 40% | 65% | 65% | 65% | 65% |
| Pressing | No | No | Yes | Yes | Yes | No |
| Comparison of thickness of porous current collector with that of | 120 μm:130 μm (1:1.08) | 120 μm:130 μm (1:1.08) | 120 μm:120 μm (1:1) | Not available (elongation occurs) | — | 70 μm:105 μm (1:1.5) |

TABLE 1-continued

|  | Example 1 | Example 2* | Comp. Ex. 1 | Comp. Ex. 2 | Comp. Ex. 3 | Comp. Ex. 4 |
|---|---|---|---|---|---|---|
| finished electrode Porosity (%) | 35 | 30 | 70 | 30 | 30 | 40 |
| Active material loading amount (mAh/cm$^2$) | 4.5 | 5 | 2.0 | Not available | 5 | 5 |
| Flexibility | Good | Good | Good | Moderate | Poor | Poor |

*Reduced pressure condition is added during slurry coating

As can be seen from Table 1, each of the electrodes including an electrode active material layer formed on a porous current collector by coating a slurry having a low solid content repeatedly according to Examples 1 and 2 satisfies a low porosity of 10-50% to realize a high-loading electrode and shows excellent flexibility. Particularly, the electrode according to Example 2 shows more decreased porosity by virtue of the use of a reduced pressure condition during the formation of multiple coating layers to provide a more increased active material loading amount. Meanwhile, the electrode according to Comparative Example 1 is obtained by coating a porous current collector only once with a slurry having a high solid content and carrying out pressing under relatively low pressure, and thus ensures flexibility. However, the electrode according to Comparative Example 1 has increased porosity, thereby making it difficult to realize a high-loading electrode.

The electrode according to Comparative Example 2 was obtained by single coating of a slurry having a high solid content on a porous current collector and application of high pressure as used in the conventional pressing process, and thus the porous current collector was elongated and deformed and could not tolerate stress when bending was applied thereto.

The electrode according to Comparative Example 3 was obtained by using an Al foil current collector according to the conventional method. Thus, although the porosity was controlled by the pressing process, the electrode could not tolerate stress when bending was applied thereto, and could not satisfy flexibility.

In addition, the electrode according to Comparative Example 4 was obtained by using a slurry having a high solid content and a thickness ratio of the porous current collector and the finished electrode larger than 1:1.2. Thus, such an increased thickness of the electrode coating layer provides poor flexibility. As a result, the electrode coating layer was separated from the surface of the current collector.

Test Example 3: Discharge Capacity Test

Each of the electrodes according to Example 2 and Comparative Example 1 was die-cut and used as a positive electrode. A polyethylene separator was interposed between the positive electrode and a lithium electrode, a counter electrode of the positive electrode. Then, an electrolyte containing 1M LiPF$_6$ dissolved in a mixed solvent including ethylene carbonate (EC) and ethylmethyl carbonate at a volume ratio of 50:50 was injected to obtain a coin type half-cell.

The obtained half-cell was charged under a constant current (CC) condition at a current of 0.2 C-rate until the voltage reached 4.45V. Next, while maintaining 4.45V under a constant voltage (CV) mode, the half-cell was cut-off at a current of 0.05 C-rate. After the half-cell was allowed to stand for 10 minutes, it was discharged under a constant current (CC) condition at 0.2 C-rate and cut-off at 3V. Then, the battery capacity was measured. The results are shown in the following Table 2 and FIG. 3a and FIG. 3b.

TABLE 2

|  | Example 2 | Comparative Example 1 |
|---|---|---|
| Discharge capacity (mAh/g) | 175 | 130 |

Figure 3A:
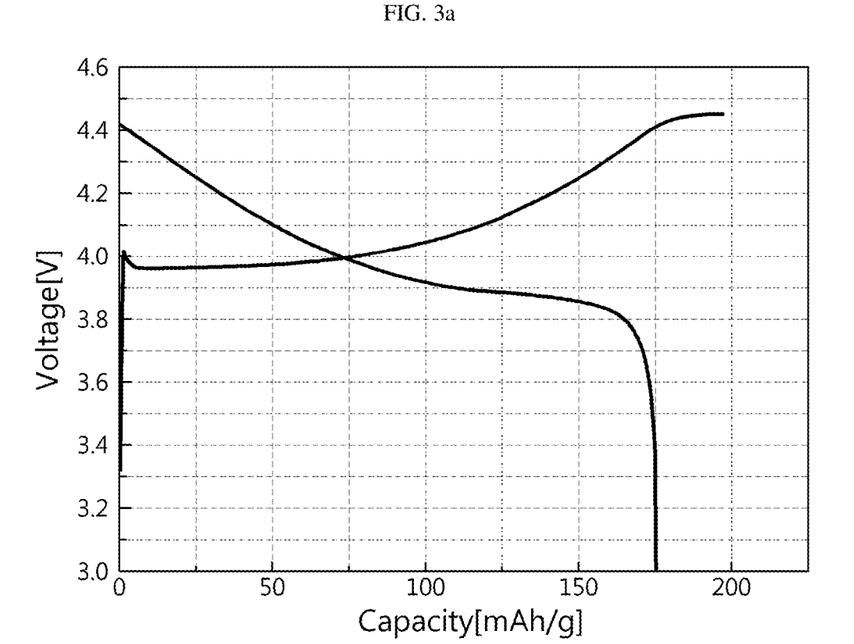
FIG. 3a and FIG. 3b show the charge/discharge curves of the batteries including the electrode according to Example 2 and Comparative Example 1, respectively.
Figure 3B:
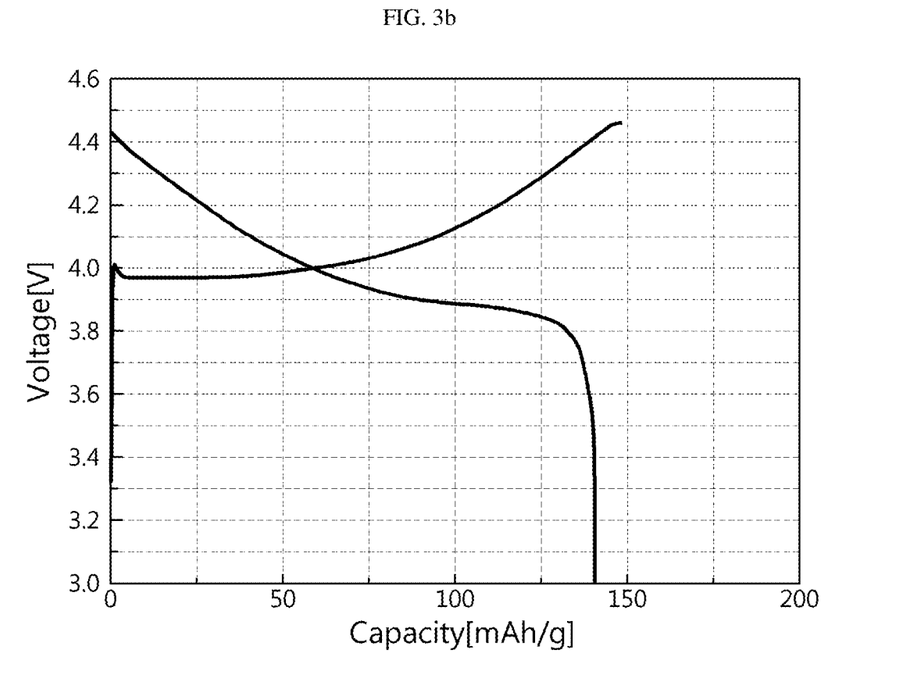

As can be seen from Table 2 and FIG. 3a and FIG. 3b, the half-cell including the electrode according to Example 2 shows higher discharge capacity as compared to Comparative Example 1. In other words, Comparative Example 1 shows a capacity lower than the designed capacity (175 mAh/g). It is thought that this is because pressing is controlled to a weak level to prevent elongation of the porous current collector during the pressing of the electrode, and thus the active material, conductive material and current collector are in slightly weak contact with each other in the pores of the porous current collector, resulting in a decrease in capacity per unit area of the electrode.

Test Example 4: C-Rate Test

To evaluate the performance of a battery depending on the ratio of a porous current collector and a finished electrode, each of the electrodes according to Example 2 and Comparative Example 4 was used to obtain a coin type half-cell in the same manner as described in Test Example 3, and the half-cell was charged and discharged. The C-rate of each half-cell is shown in FIG. 4.

Figure 4:
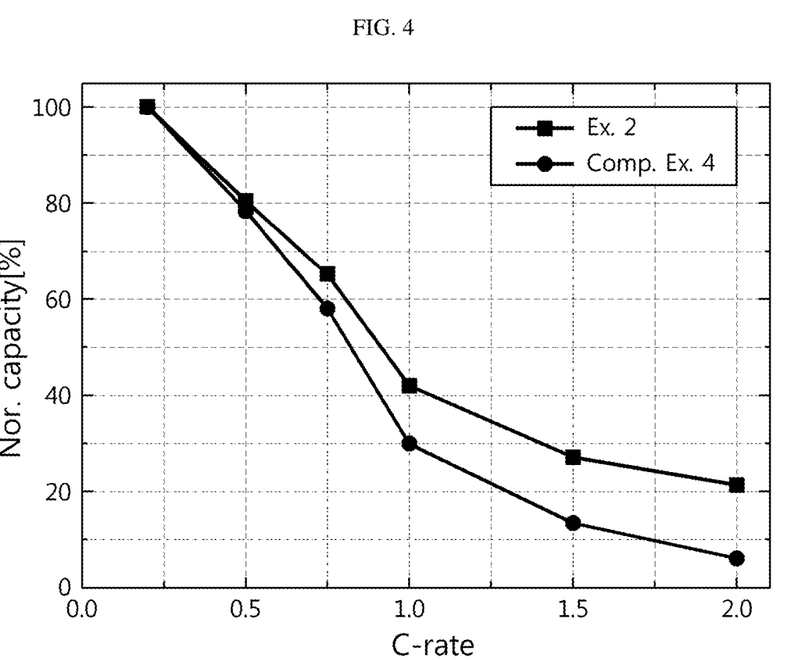
FIG. 4 shows the C-rates of the batteries including the electrodes according to Example 2 and Comparative Example 4.

As can be seen from FIG. 4, even though the electrodes according to Example 2 and Comparative Example 4 have the same loading amount, the half-cell using the electrode satisfying a thickness ratio of a porous current collector and a finished electrode within a range of 1:1.05-1:1.2 shows a higher C-rate, as compared to the half-cell using the electrode in which the thickness ratio is not within the above-defined range (thickness ratio 1:5) according to Comparative Example 4.

What is claimed is:
1. A flexible electrode comprising a porous current collector having a plurality of pores, and an electrode active material layer formed in the plurality of pores and on the surface of the porous current collector, wherein the porous current collector and the flexible electrode have a thickness ratio of 1:1.05-1:1.2, wherein the electrode active material layer is configured to fill up the plurality of pores of the porous current collector, and has a loading amount of 3.0-20.0 mAh/cm$^2$, and the flexible electrode including the porous current collector and the electrode active material layer has a porosity of 10-50%, wherein the flexible electrode is configured to begin cracking or separation of active material of the electrode active material layer at a minimum endurance of bending repeated 1,000 times or more in a bending test using a 15R bar having a diameter of 30 mm, and wherein the thickness ratio, loading amount, and minimum endurance of bending are the result of not pressing the electrode active material layer.

2. The flexible electrode according to claim 1, wherein the porous current collector and the flexible electrode have a thickness ratio of 1:1.05-1:1.1.

3. The flexible electrode according to claim 1, wherein the plurality of pores present in the porous current collector have an average diameter of 5-100 μm.

4. The flexible electrode according to claim 1, wherein the flexible electrode including the porous current collector and the electrode active material layer has a porosity of 20-40%.

5. A lithium secondary battery comprising the flexible electrode as defined in claim 1.

\* \* \* \* \*